United States Patent [19]
Howell

[11] Patent Number: 5,203,833
[45] Date of Patent: Apr. 20, 1993

[54] FOOD STORAGE CONTAINER HEATED AND COOLED BY CONDITIONED AIR IN A MOTOR VEHICLE

[76] Inventor: David S. Howell, 1734 Lakeview Blvd., N. Ft. Myers, Fla. 33903

[21] Appl. No.: 851,314

[22] Filed: Mar. 16, 1992

[51] Int. Cl.$^5$ .................. F25D 17/08; F25D 1/00
[52] U.S. Cl. ........................... 165/41; 62/337; 62/244; 62/457.7; 62/457.9
[58] Field of Search .............. 165/41; 62/239, 244, 62/243, 457.7, 457.9, 331, 337

[56] References Cited

U.S. PATENT DOCUMENTS

| | | | |
|---|---|---|---|
| 2,287,404 | 6/1942 | Zerk | 62/244 |
| 2,902,838 | 9/1959 | Nichols | 62/337 |
| 3,043,116 | 7/1962 | Fuller | 62/337 |
| 3,410,337 | 11/1968 | Priest | 165/41 |
| 3,505,830 | 4/1970 | Koerner | 62/244 |
| 3,757,851 | 9/1973 | Marble | 165/41 |
| 3,916,639 | 11/1975 | Atkinson | 62/244 |
| 4,478,052 | 10/1984 | McDowell | 62/244 |
| 4,545,211 | 10/1985 | Gaus | 62/244 |
| 4,637,222 | 1/1987 | Fujiwara et al. | 62/244 |
| 4,936,103 | 6/1990 | Newman | 62/244 |

Primary Examiner—John K. Ford
Attorney, Agent, or Firm—Michael I. Kroll

[57] ABSTRACT

A food storage container heated and cooled by conditioned air in a motor vehicle is provided which consists of a housing having a compartment for the placement of the food therein. A structure connected between the compartment of the housing and a conduit line carrying the conditioned air therethrough is for diverting the conditioned air into the compartment of the housing for heating and cooling the food.

11 Claims, 2 Drawing Sheets

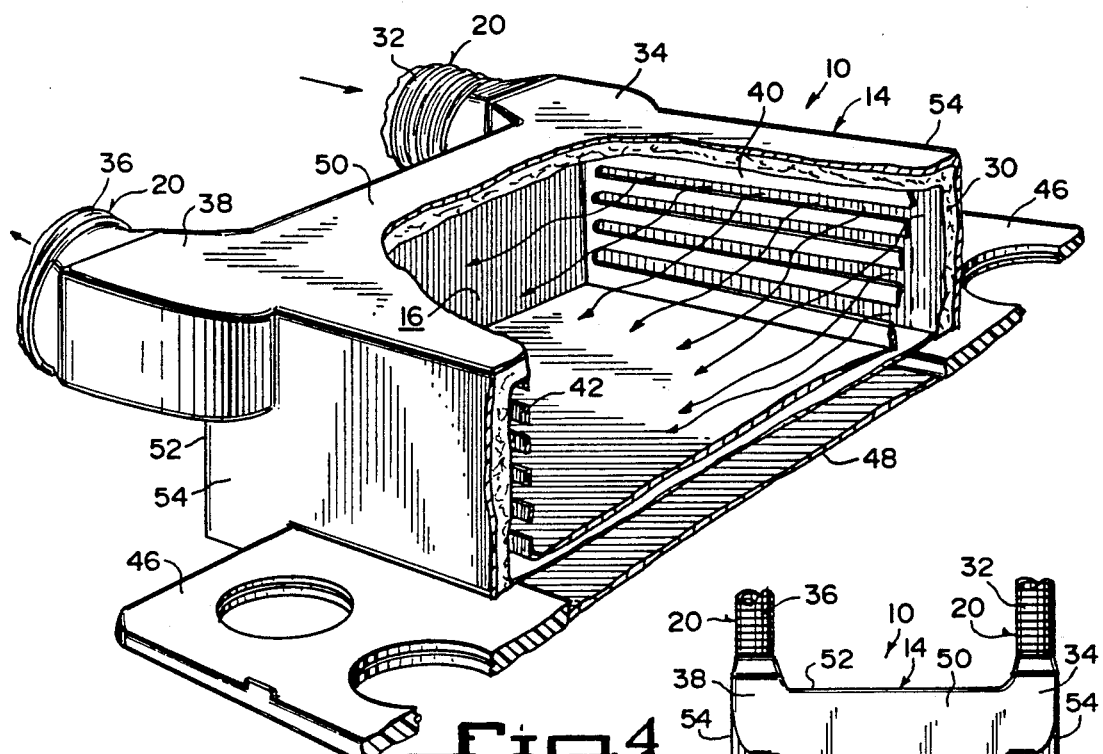
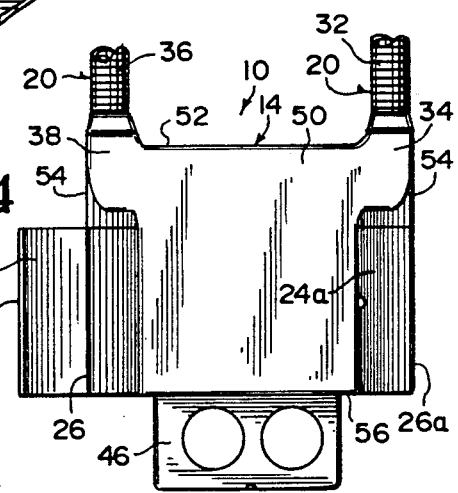
Fig. 6
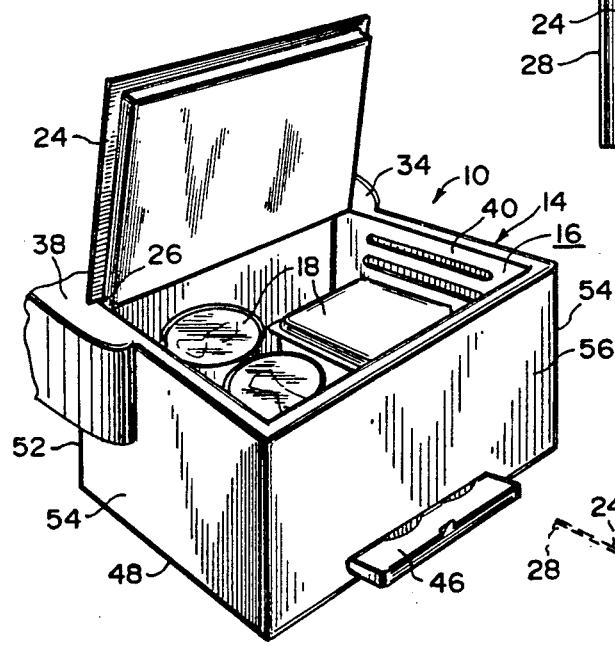
Fig. 5
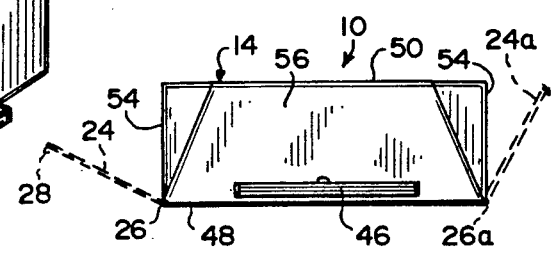
Fig. 7

5,203,833

FOOD STORAGE CONTAINER HEATED AND COOLED BY CONDITIONED AIR IN A MOTOR VEHICLE

BACKGROUND OF THE INVENTION

1. Field of the Invention

The instant invention relates generally to insulated food receptacles and more specifically it relates to a food storage container heated and cooled by conditioned air in a motor vehicle.

2. Description of the Prior Art

Numerous insulated food receptacles have been provided in prior art that are adapted to keep various food within the receptacles either hot or cold for long periods of time, so that the food may be used and consumed at later times. While these units may be suitable for the particular purpose to which they address, they would not be as suitable for the purposes of the present invention as heretofore described.

SUMMARY OF THE INVENTION

A primary object of the present invention is to provide a food storage container heated and cooled by conditioned air in a motor vehicle that will overcome the shortcomings of the prior art devices.

Another object is to provide a food storage container heated and cooled by conditioned air in a motor vehicle, in which the conditioned air flows through a conditioned air conduit into the container, thus cooling or heating the contents therein that can be removed from an access door to be consumed by the occupants within the motor vehicle.

An additional object is to provide a food storage container heated and cooled by conditioned air in a motor vehicle, in which the container contains pull-out trays to hold drinks and snacks thereon for the occupants within the motor vehicle.

A further object is to provide a food storage container heated and cooled by conditioned air in a motor vehicle that is simple and easy to use.

A still further object is to provide a food storage container heated and cooled by conditioned air in a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 4 is an enlarged perspective view with parts broken away and in section.

FIG. 5 is a perspective view of a first alternative configuration with its top access door opened.

FIG. 6 is a top view of a second alternative configuration with one of its two side access doors opened.

FIG. 7 is a front view taken in direction of arrow 7 in FIG. 6 showing the two side access doors opened in phantom.

FIG. 8 is a top view of a third alternative configuration showing only one input air flow pipe having a shut-off valve connected to the conditioned air conduit and the housing.

DETAILED DESCRIPTION OF THE PREFERRED EMBODIMENTS

Figure 1:
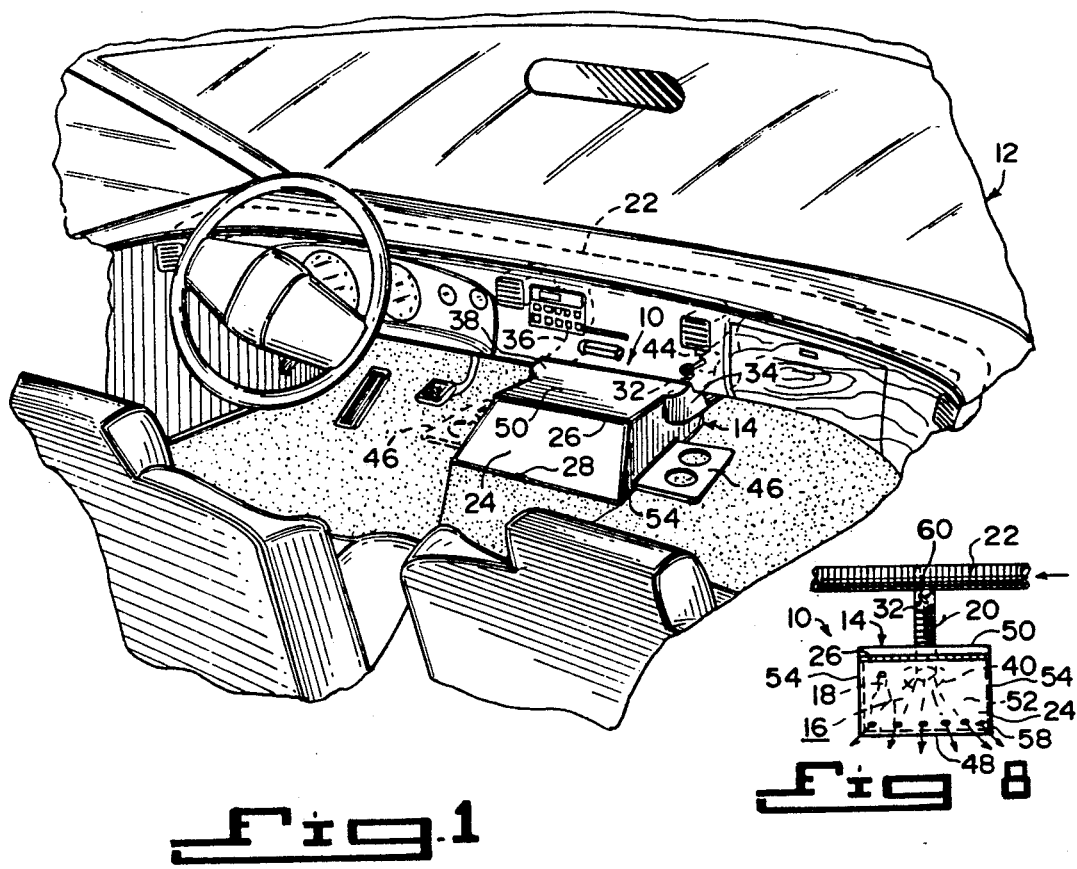
FIG. 1 is a perspective view of the front interior of a motor vehicle with the instant invention installed therein.

Turning now descriptively to the drawings, in which similar reference characters denote similar elements throughout the several views, the Figures illustrate a food storage container 10 heated and cooled by conditioned air in a motor vehicle 12, which consists of a housing 14 having a compartment 16 for the placement of the food 18 therein. A structure 20 connected between the compartment 16 of the housing 14 and a conduit line 22 carrying the conditioned air therethrough is for diverting the conditioned air into the compartment 16 of the housing 14 for heating and cooling the food 18.

An access door 24 is hinged at 26 to the housing 14. A handle 28 is affixed to the access door 24, so that the access door 24 can be opened and closed. Insulated material 30 is within the compartment 16 and on the back of the access door 24 to keep the food 18 hot and cold much longer.

The diverting structure 20 includes an inlet pipe 32 connected between a first rear corner 34 of the housing 14 and the conduit line 32. An outlet pipe 36 is connected between a second rear corner 38 of the housing 14 and the conduit line 22. An inlet air grate 40 is internally positioned and spaced away from the insulated material 30 on one side thereof, so that the conditioned air coming in from the inlet pipe 32 can pass through the inlet air grate 40 into the compartment 16 in the housing 14. An outlet air grate 42 is internally positioned and spaced away from the insulated material 30 on another side thereof, so that the conditioned air can pass through the outlet air grate 42 into the outlet pipe 36 and back into the conduit line 22.

The diverting structure 20 further includes a flow diverter valve 44 at the juncture of the inlet pipe 32 and the conduit line 22. When the flow diverter valve 44 is placed in a first position, it will allow the conditioned air in the conduit line 22 to enter the inlet pipe 32. When the flow diverter valve 44 is placed in a second position, it will prevent the conditioned air in the conduit line 22 to enter the inlet pipe 32.

The food storage container 10 can further contain at least one pull-out tray 46 from the housing 14 to hold soda cans and the like thereon.

Figures 2, 3:
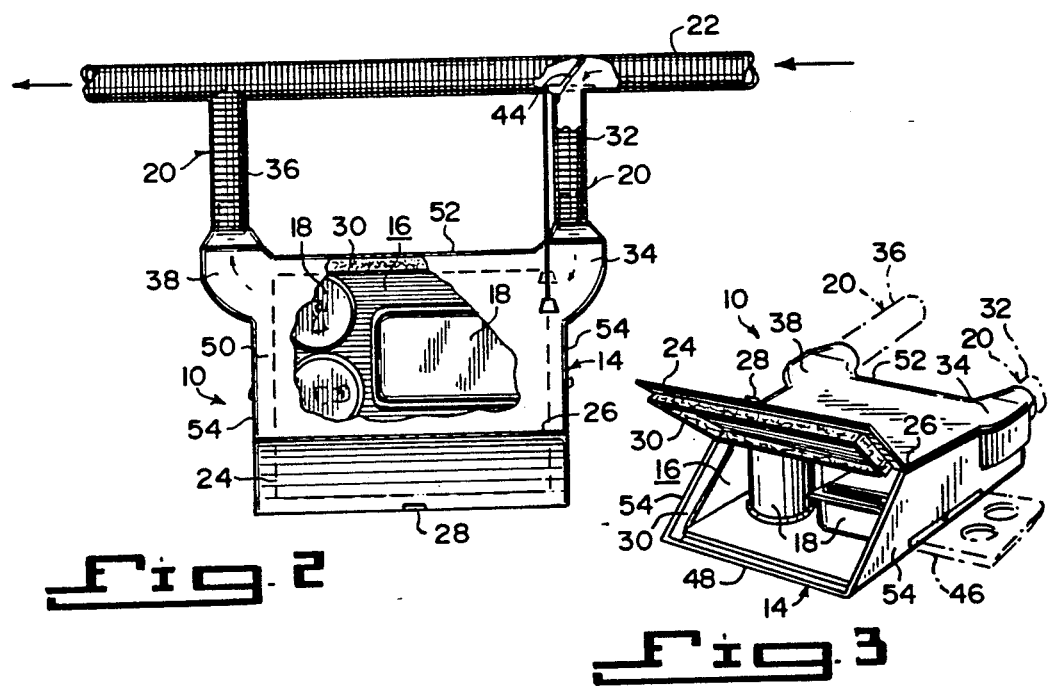
FIG. 2 is a top view with parts broken away of the instant invention per se connected to the conditioned air conduit.
FIG. 3 is a perspective view showing the access door opened.

The housing 14, as shown in FIGS. 1 through 4, includes a bottom wall 48 and a top wall 50. A rear wall 52 extends between the bottom wall 48 and the top wall. A pair of side walls 54 are also provided with each extending between the bottom wall 48 and the top wall 50. The access door 24 will be hinged at 26 to the forward edge of the top wall 50 in an angular position.

The housing 14, as shown in FIG. 5, includes a bottom wall 48, a rear wall 52 extending upwardly from the bottom wall 48 and a front wall 56 extending upwardly from the bottom wall 48. A pair of side walls 54 are provided with each extending upwardly from the bottom wall 48. The access door 24 will be hinged at 26 to the rearward edge of the rear wall 52 in a horizontal position.

The housing 14, as shown in FIGS. 6 and 7, includes a bottom wall 48 and a top wall 50. A rear wall 52 extends between the bottom wall 48 and the top wall 50, while a front wall 56 extends between the bottom wall 48 and the top wall 50. A pair of side walls are provided, with each extending between a rearward portion of the bottom wall 48 and the top wall 50. The access door 24 will be hinged at 26 to a forward side edge of the bottom wall 48 in an angular position. A second access door 24a is hinged at 26a to an opposite forward side edge of the bottom wall 48 in an angular position.

The diverting structure 20, as shown in FIG. 8, includes an inlet pipe 32 connected between a rear portion of the housing 14 and the conduit line 22. An inlet air grate 40 is internally positioned and spaced away from the insulated material 30 on the rear portion thereof, so that the conditioned air coming in from the inlet pipe 32 can pass through the inlet air grate 40 into the compartment 16 in the housing 14. The access door 24 has a plurality of small apertures 58 opposite from the inlet air grate 40, so that the conditioned air within the compartment 16 can pass through the small apertures 58 and into the motor vehicle 12. A shut-off valve 60 is also provided in the inlet pipe 32 to control the flow of the conditioned air into the compartment 16 in the housing 14.

The housing 14 includes a bottom wall 48, a top wall 50 and a rear wall 52, extending between the bottom wall 48 and the top wall 50. A pair of side walls 54 are provided, with each extending between the bottom wall 48 and the top wall 50. The access door 24 will be hinged at 26 to a top forward edge of the top wall 50 in a vertical position.

LIST OF REFERENCE NUMBERS 10 food storage container
12 motor vehicle
14 housing
16 compartment in 14
18 food
20 diverting structure
22 conduit line
24 access door
24a second access door
26 hinge on 24
hinge 26a on 24a
28 handle on 24
30 insulated material
32 inlet pipe
34 first rear corner of 14
36 outlet pipe
38 second rear corner of 14
40 inlet air grate
42 outlet air grate
44 flow diverter valve at 32 and 22
46 pull-out tray
48 bottom wall
50 top wall
52 rear wall
54 side wall
56 front wall
58 small aperture in 24
60 shut-off valve in 32

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A food storage container heated and cooled by conditioned air from a motor vehicle thermal conditioning system, which comprises:
    a) a housing having a compartment for the placement of the food therein; and
    b) means connected between said compartment of said housing and a conduit line of said vehicle thermal conditioning system carrying the conditioned air therethrough, for diverting the conditioned air into said compartment of said housing for heating and cooling the food, said diverting means includes an inlet pipe connected between a first rear corner of said housing and the conduit line, and an outlet pipe connected between a second rear corner of said housing and the conduit line of said vehicle thermal conditioning system.

2. A food storage container heated and cooled by conditioned air in a motor vehicle as recited in claim 1, wherein said housing further includes:
    a) an access door hinged to said housing; and
    b) a handle affixed to said access door, so that said access door can be opened and closed.

3. A food storage container heated and cooled by conditioned air in a motor vehicle as recited in claim 2 wherein said housing further includes insulated material w thin said compartment and on the back of said access door, to keep the food hot and cold much longer.

4. A food storage container heated and cooled by conditioned air in a motor vehicle, as recited in claim 3, wherein said diverting means further includes:
    a) an inlet air grate internally positioned and spaced away from said insulated material on one side thereof, so that the conditioned air coming in from said inlet pipe can pass through said inlet air grate into said compartment in said housing; and
    b) an outlet air grate internally positioned and spaced away from said insulated material on another side thereof, so that the conditioned air can pass through said outlet air grate into said outlet pipe and back into the conduit line.

5. A food storage container heated and cooled by conditioned air in a motor vehicle as recited in claim 4, wherein said diverting mean further includes a flow diverter valve at the juncture of said inlet pipe and the conduit line, so that when said flow diverter valve is placed in a first position it will allow the conditioned air in the conduit line to enter said inlet pipe and when said flow diverter valve is placed in a second position it will prevent the conditioned air in the conduit line to enter said inlet pipe.

6. A food storage container heated and cooled by conditioned air in a motor vehicle as recited in claim 5, further comprising at least one pull-out tray from said housing to hold soda cans and the like thereon.

7. A food storage container heated and cooled by conditioned air in a motor vehicle as recited in claim 6, wherein said housing includes:
 a) a bottom wall;
 b) a top wall;
 c) a rear wall extending between said bottom wall and said top wall; and
 d) a pair of side walls, each extending between said bottom wall and said top wall, so that said access door will be hinged to the forward edge of said top wall in an angular position.

8. A food storage container heated and cooled by conditioned air in a motor vehicle as recited in claim 6, wherein said housing includes:
 a) a bottom wall;
 b) a rear wall extending upwardly from said bottom wall;
 c) a front wall extending upwardly from said bottom wall; and
 d) a pair of side walls, each extending upwardly from said bottom wall, so that said access door wall be hinged to the rearward edge of said rear wall in a horizontal position.

9. A food storage container heated and cooled by conditioned air in a motor vehicle as recited in claim 6, wherein said housing includes:
 a) a bottom wall;
 b) a top wall;
 c) a rear wall extending between said bottom wall and said top wall;
 d) a front wall extending between said bottom wall and said top wall;
 e) a pair of side walls, each extending between a rearward portion of said bottom wall and said top wall, so that said access door will be hinged to a forward side edge of said bottom wall in an angular position; and
 f) a second access door hinged to an opposite forward side edge of said bottom wall in an angular position.

10. A food storage container heated and cooled by conditioned air in a motor vehicle as recited in claim 3, wherein said diverting means includes:
 a) an inlet pipe connected between a rear portion of said housing and the conduit line;
 b) an inlet grate internally positioned and spaced away from said insulated material on the rear portion thereof, so that the conditioned air coming in from said inlet pipe can pass through said inlet air grate into said compartment in said housing;
 c) said access door having a plurality of small apertures opposite from said inlet air grate, so that the conditioned air within said compartment can pass through said small apertures and into the motor vehicle; and
 d) a shut-off valve in said inlet pipe to control the flow of the conditioned air into said compartment in said housing.

11. A food storage container heated and cooled by conditioned air in a motor vehicle as recited in claim 10, wherein said housing includes:
 a) a bottom wall;
 b) a top wall;
 c) a rear wall extending between said bottom wall and said top wall; and
 d) a pair of side walls, each extending between said bottom wall and said top wall, so that said access door will be hinged to a top forward edge of said top wall in a vertical position.

* * * * *